(12) United States Patent
Kerner

(10) Patent No.: US 6,170,345 B1
(45) Date of Patent: Jan. 9, 2001

(54) DEVICE FOR POSITIONING A MEASURING SENSOR

(75) Inventor: Leander Kerner, Munich (DE)

(73) Assignee: MTU Motoren-und Turbinen-Union Muenchen GmbH, Munich (DE)

( * ) Notice: Under 35 U.S.C. 154(b), the term of this patent shall be extended for 0 days.

(21) Appl. No.: 09/125,656

(22) PCT Filed: Feb. 6, 1997

(86) PCT No.: PCT/EP97/00515

§ 371 Date: Aug. 21, 1998

§ 102(e) Date: Aug. 21, 1998

(87) PCT Pub. No.: WO97/31270

PCT Pub. Date: Aug. 28, 1997

(30) Foreign Application Priority Data

Feb. 23, 1996 (DE) .............................................. 196 06 794

(51) Int. Cl.$^7$ .................................................. G01M 19/00
(52) U.S. Cl. .............................. 73/866.5; 73/1.88; 702/87
(58) Field of Search ................................. 73/866.5, 1.79, 73/1.75, 1.88; 33/502; 702/92, 93, 94, 95, 87

(56) References Cited

U.S. PATENT DOCUMENTS

| | | | |
|---|---|---|---|
| 3,571,937 | * | 3/1971 | Sears ........................................ 33/312 |
| 3,747,084 | * | 7/1973 | Hartung ................................. 340/530 |
| 4,174,577 | * | 11/1979 | Lewis ..................................... 702/6 X |
| 4,235,021 | * | 11/1980 | Claycomb ........................... 73/37 X |
| 4,575,947 | * | 3/1986 | Stauber .................................. 33/501 |
| 5,065,703 | * | 11/1991 | Lee ................................... 73/866.5 X |
| 5,907,111 | * | 5/1999 | Josten et al. ......................... 73/866.5 |

FOREIGN PATENT DOCUMENTS 0618521  10/1994  (EP) .

OTHER PUBLICATIONS

Article entitled: "A computer operated traversing gear for three–dimensional flow surveys in channels"; by S. Lau et al.; 8212 Experiments in Fluids, pp. 475–476; 14 (1993) No. 6, Berlin, Germany month not given.

* cited by examiner

Primary Examiner—Thomas P. Noland
(74) Attorney, Agent, or Firm—W. F. Fasse; W. G. Fasse

(57) ABSTRACT

The device is constructed to position a measuring sensor, especially a sensor head at an angle to a sensor shaft, precisely at the point of measurement and in the direction of a fluid flowing in a test tube, in which there is an adjuster through which the measuring sensor, in a coaxial arrangement, can be adjusted via a first adjusting motor about its axis and/or by a second adjusting motor along its axis. A control device communicates with an electronic computer for controlling the sensor adjustment. An adjuster (4) is coupled to the sensor to rotate in unison therewith and has a rotatable pendulum which, in the position of rest transversely to the test tube axis defines the zero position of the sensor. Limit positions of the pendulum are predetermined from a relative movement of the adjuster about the axis which can be photometrically converted into position signals. The computer mathematically halves the angular adjustment calculated from the position signals received and sets the adjuster with the sensor to mechanical zero by the respective positioning stop command signals.

26 Claims, 4 Drawing Sheets

DEVICE FOR POSITIONING A MEASURING SENSOR

CROSS-REFERENCE TO RELATED APPLICATIONS:

Not Applicable.

FEDERALLY SPONSORED RESEARCH AND DEVELOPMENT

Not Applicable

MICROFICHE APPENDIX

Not Applicable

FIELD OF THE INVENTION

The invention relates to an apparatus for precisely aiming a measuring probe or a sensor head onto a location to be sensed or monitored in a test pipe with due regard for a fluid flow direction flowing through the test pipe.

BACKGROUND INFORMATION

For the purpose of testing individual components of a turbine engine, for example of a compressor, a turbine, or a combustion chamber, measuring probes or flow measuring probes are used. In this context, the measuring probes may be pressure, temperature, anemometer, or direction measuring probes, among others. The measurement is carried out in a pressurized air or hot gas flow, either directly on the engine or, for example on a cylinder pipe-type test specimen, by means of which existing process conditions or parameters, or process conditions or parameters to be varied, are simulated on a test stand.

In this context, the measuring probes identified as examples often require sensors or measuring feelers, of which several may be arranged with a spacing next to one another in a common plane and angled perpendicularly to the probe axis, for example. The arrangement of at least one sensor or measuring feeler on an arm or within a pipe section of the probe, cantilevered perpendicularly from the probe axis, is also possible, for example. In this context it is difficult to adjust such a probe exactly and quickly to the local measuring position, especially in the context of a zero point compensation relative to the lengthwise axis of the test pipe or housing. Especially the housing must be adjusted so that a measuring sensor or head that is angled perpendicularly from the probe axis also coincides centrally exactly with the lengthwise axis of the test body or housing, and in fact in such a manner that it extends exactly parallel to this lengthwise axis with a radial spacing in the measuring position.

An arrangement has been examined, in which a mounting support for a flow measuring probe is fixable on the outer circumference of a cylindrical test pipe. The measuring probe is arranged on the mounting support so as to be slidable in the direction of its lengthwise axis and rotatable about the lengthwise axis so as to be tunably adjustable to the measuring location. The examined case provides a mechanical-optical zero point alignment. In this context, a light source is connected externally and circumferentially rotatably with an orienting head of the measuring probe. A support stand with an outer plan parallel plate axially spaced from the light source on the light head is arranged on the outer circumference of the test pipe by means of a prism. The correct probe position (null point adjustment) is to be determined by repeated repositioning of the light source (parallax method) relative to three marks of the planar plate.

Besides time consuming and complicated positioning and adjusting processes, the possibility of errors is particularly large in connection with relatively large pipe radii, and is predominantly based on the manual handleability. In this context particular reference is made to the setting angle error in the path of the orienting heading between the light source or probe and the planar plate or support stand, based on respective circumferential relative mounting measurement errors of the probe and of the support stand relative to the common lengthwise axis of the test body.

In repositioning devices that have already been proposed, the repositioning accuracy suffers as a result of the use of toothed gear drives or toothed belts. Furthermore, an operation that is, for example, thermally protected from the test chamber or room is practically impossible. In other words, test runs must often be interrupted as a result of frequently required manual operations.

OBJECT OF THE INVENTION

The invention has for its object to propose an apparatus with which a flow measuring probe of the described type can be quickly and exactly positioned to the required measuring position, with a small structural and equipping effort and expense.

SUMMARY OF THE INVENTION

According to the invention there is provided an apparatus for positioning a measuring probe (3, 10) having a probe axis (A), relative to a measuring location and relative to a fluid flow direction (F) in a fluid flow testing enclosure (1) having an enclosure axis (L), said apparatus comprising:

(a) a positioning device (2) having a positioning axis extending coaxially in axial alignment with said probe axis (A), said positioning device comprising servomotor means for positioning said measuring probe (3, 10) by rotating said probe around said probe axis (A) and by displacing said measuring probe (3, 10) in a direction (T) of said probe axis (A), (b) a control system including an electronic computer (27) and a control device (21) communicating with said electronic computer (27) and with said servomotor means for controlling said positioning of said measuring probe, (c) an adjusting device (4) rigidly coupled to said measuring probe (3, 10) for rotation with said measuring probe, said adjusting device (4) comprising a pendulum (6) rotatably supported on a pendulum journal axis (8) for defining a zero position (N) for said measuring probe (3, 10) when said pendulum (6) is in a rest position, (d) pendulum limits (G1, G2) defined in said adjusting device (4) in such positions that said zero position (N, M) is located centrally between said pendulum limits (G1, G2), (e) means (9, 9') for generating signals in response to pendulum excursions reaching said pendulum limits (G1, G2) and for providing respective limit position signals to said electronic computer (27), and wherein (f) said electronic computer (27) generates control signals in response to said limit position signals by mathematically dividing a pendulum angular excursion range defined by said limit position signals between said pendulum limits (G1, G2), into two halves for controlling said servomotor means with said control signals until a line (M) through a center of gravity (P) of said pendulum (6) coincides with said zero position (N), whereby said measuring probe (3, 10) is in a defined position relative to said enclosure axis (L).

The invention makes it possible to achieve a fully automatic probe repositioning including a most simply achievable zero adjustment (mechanical zero).

According to one aspect of the invention, it is possible to completely operate the apparatus unhindered by the prevailing test chamber atmosphere, in the scope of the control device that is installed in the operating room and that communicates with the computer, after the corresponding reference cables have been connected with the positioning device for the probe.

By using a light beam barrier, especially embodied as a light coupler, the limit positions or pendulum limit positions used for the probe zero adjustment can be comparatively simply and exactly represented or converted into the necessary logic signals. For the latter purpose, essential components or building blocks of is a circuit can be integrated into the housing of :he adjusting device. A simple reference cable connection - adjusting device, circuit, positioning device or probe - makes the zero adjustment operational.

The adjusting device itself is constructed in a simple and maintenance-friendly manner, and the integrated building blocks of the circuit are easily accessible and moreover are shieldable in a manner that is tightly closed or sealed against the surroundings by means of the releasable housing cover.

An optimal environmentally tight as well as maintenance friendly construction of the positioning device results from the use of a plurality of modular housings combined with a housing construction by means of which motor-driven positionings that are simultaneous or separate from one another are comparatively simply integrated into the device concept by means of play-free direct drives.

In the context of the hollow cylindrical coaxial device construction involving positioning servo-motors, a rotor or rotors, a translational drive and positioning, an unhindered probe positioning and cable guidance integral with the pipe is made possible. The probe can easily be inserted into the adjusting device from above or from below.

A manner of construction of the adjusting device that is light in weight and simultaneously strong and rigid can be achieved by the strong lightweight structural materials such as titanium, titanium alloys, fiber reinforced composite materials, whereby glass fibers are particularly useful as reinforcing fibers.

The construction of the positioning servo-motors used herein makes it possible to achieve exactly coordinatable probe positionings, especially with the help of the incremental encoders in the context of a most precise angle repositioning function, via the prescribed control signals of the limit positions wherein respective logic signals are converted into control impulses, or by the software implanted in the computer for the rotational or linear translational probe repositioning.

A practical and comparatively simple probe drive or positioning kinematic system is provided to make it possible to carry out the simultaneous or respectively separate rotational or translational stroke positioning. A comparatively small total structural height of the positioning device results from the direct drive of the second positioning servo-motor on a spindle nut.

A simple and exact probe fixing arrangement is made possible by mounting the probe on the outside of the stroke pipe by a clamping jaw head.

A locally targeted, highly intensive cooling device is provided for cooling the base or pedestal, in order to perform testing operations at comparatively high temperatures of the fluid, for example a hot gas.

A very practical adjustment of the positioning device relative to the securing location is provided by mounting the housing base of the positioning device so that it is rotatable and adjustable when a clamp is loosened.

An optimal adjustment of the positioning device and of the probe, circumferentially relative to the axis of the test body, is achieved by a circumferentially effective adjustment motor which is responsive to a control program. The apparatus of the invention can be used directly on the housing of a turbine engine, in other words, the invention shall not b e limited to the basic term "test pipe" or "test body".

BRIEF DESCRIPTION OF THE DRAWINGS

Example embodiments of the invention are explained below with reference to the accompanying drawings, wherein.

DETAILED DESCRIPTION OF PREFERRED EXAMPLE EMBODIMENTS AND OF THE BEST MODE OF THE INVENTION

Figure 1:
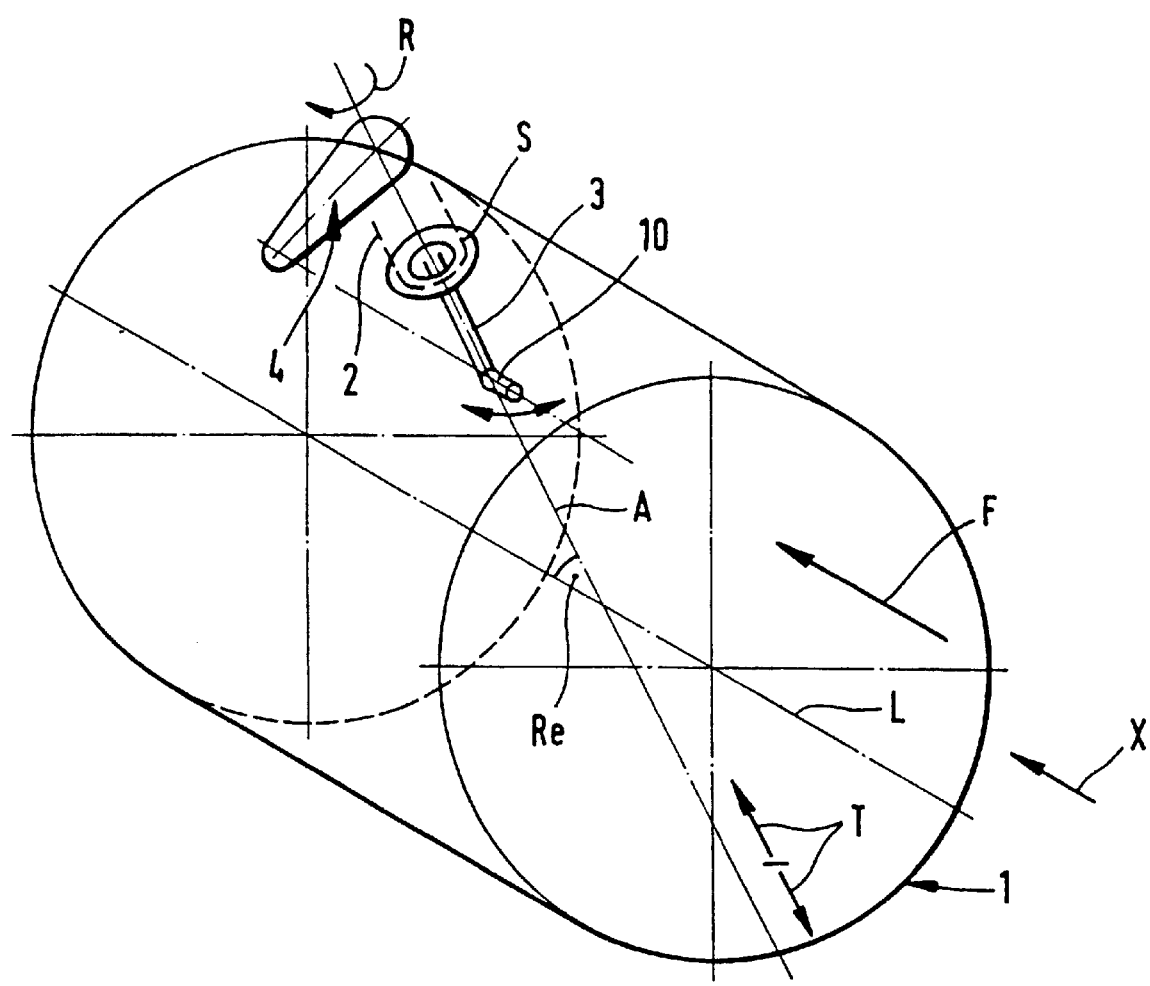
FIG. 1 shows a schematic, perspective view of a test pipe, with the associated arrangement of the probe positioning device, with an adjusting device that contributes laterally outwardly an d upwardly.

The invention may, for example, be carried out on a cylindrical test pipe 1 with a straight lengthwise axis L shown in FIG. 1. A probe positioning device 2 is connected to the test pipe 1 at a prepared circumferential location S in a flange-like manner. The probe adjusting device 2 will be described below in greater detail. A flow measuring probe 3 is coaxially mounted to the probe adjusting device 2. The probe adjusting device 2 includes suitable drive means such as motors, drive transmissions, threaded roller spindles, guide carriages, etc. in order to drive the measuring probe 3 in a translational stroke movement T in the direction of its lengthwise axis A and/or a rotational movement R about its lengthwise axis A.

In order to reposition the probe 3 translationally (T) or rotationally (R) in a direction toward the required measuring position, between the inner wall circumference and the lengthwise axis L of the test pipe 1, a control arrangement is provided, which will be described below in greater detail. Before a control process is started, a zero point correction or adjustment of the probe 3 must be carried out.

Figure 2:
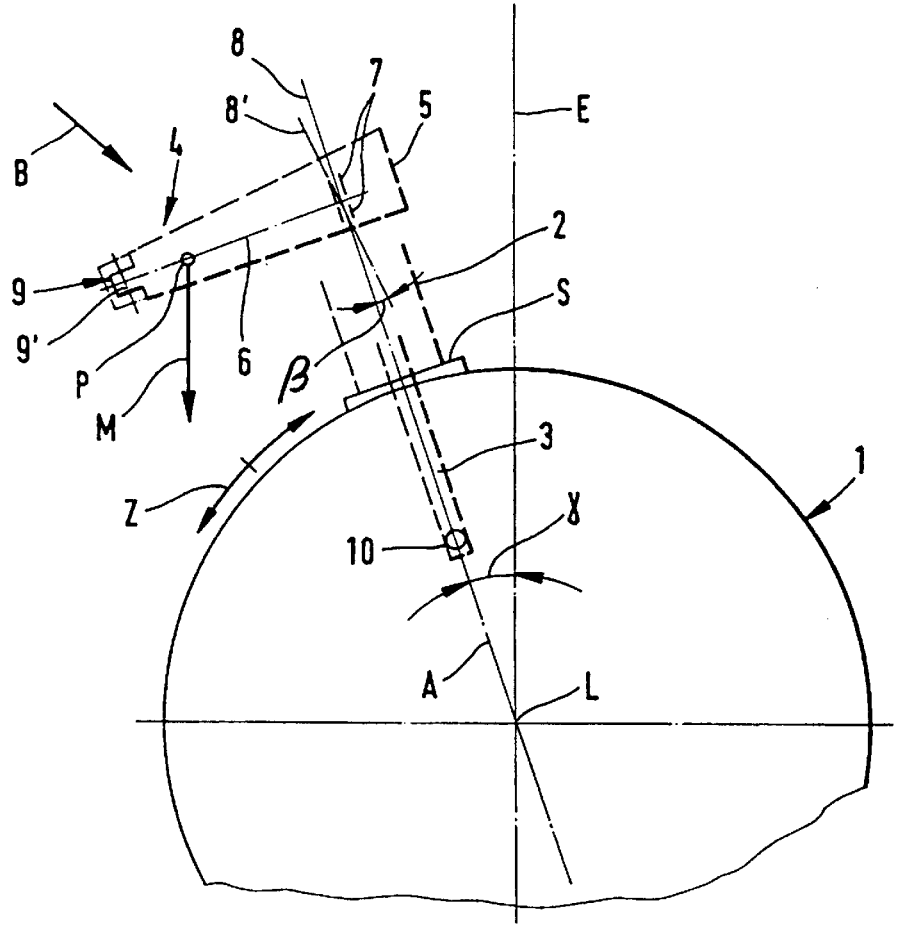
FIG. 2 shows a front view along the view direction X of FIG. 1, whereby the test pipe i s shown locally broken off at the bottom.
Figure 3:
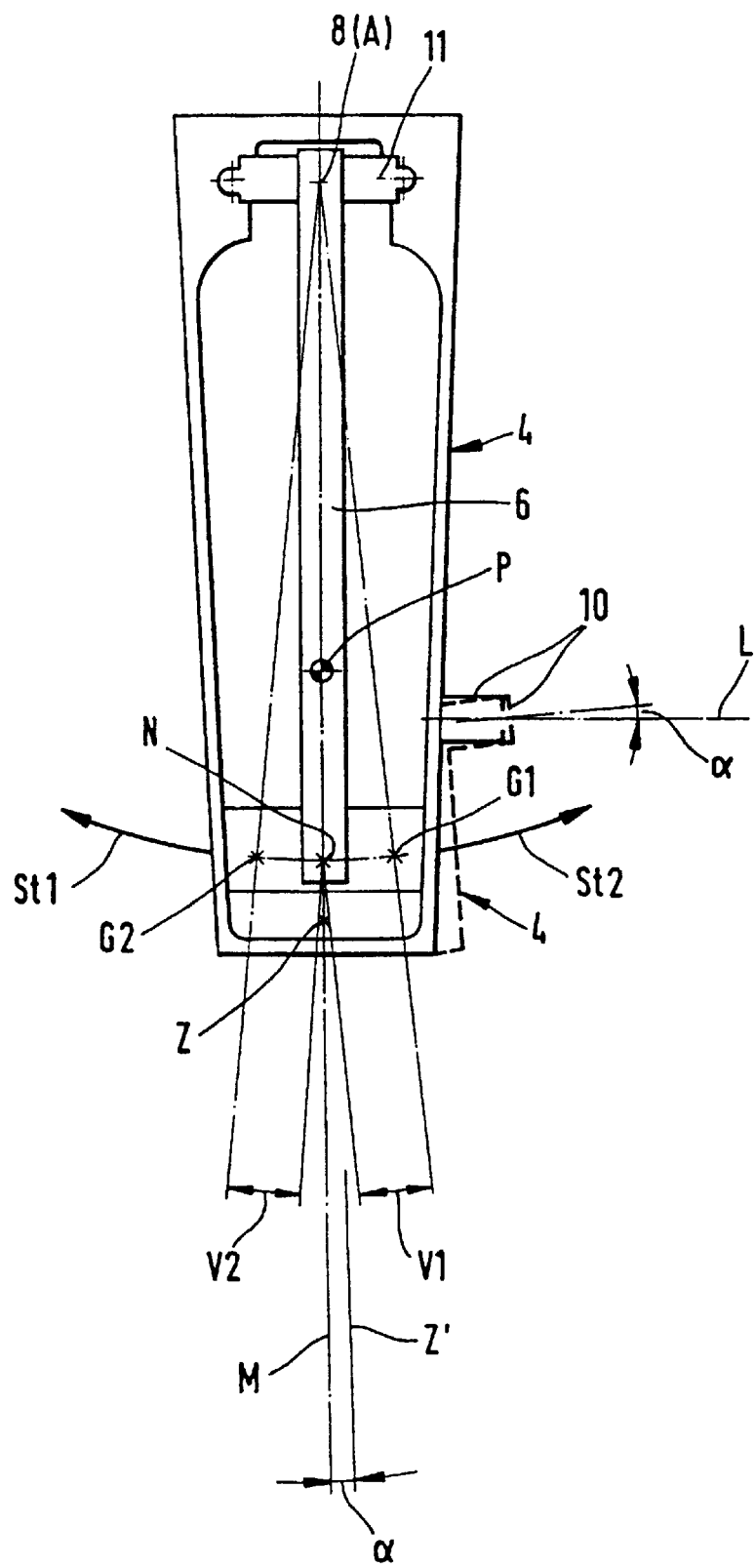
FIG. 3 shows a schematic view that is open at the top, of the adjusting device in the view direction B of FIG. 2, with a further detailed illustration of the relative zero position and of an error incidence angle α of the device and of the probe a relative to the test pipe axis L.

In order to achieve such a zero point correction, the invention provides a pendular adjusting device 4 that is first schematically represented according to FIGS. 1, 2 and 3. This adjusting device 4 comprises a housing 5 that tapers uniformly with a wedge-shape, here from the right to the left (FIG. 2). A pendulum 6 is pivotably mounted in a housing 5 for rotation about an axis 8 on bearings 7 along the bottom linear housing surface. The adjusting device 4 is cantilevered outwardly perpendicularly to the axis A along the straight bottom surface of the housing 5. Thus, the adjusting device 4 is connected with the outer end or with an orienting head of the probe 3 through a plug-on mounting fixture, with a movable but entrainable surface calibration. The rotation axis 8' of the pendulum 6 could intersect the common lengthwise axis A of the probe 3 and of the positioning device 2 at an angle β of, for example 10°. According to FIG. 2, for example, the position of the pendulum rotation axis 8 coincides with the lengthwise axis A, which consequently serves the function of a so-called "apparent vertical" if one imagines that the illustrated lengthwise central plane E extends vertically. Except for the top positions defined by the plane E, in this arrangement the pendulum-type adjusting device 4 can be positioned around the pipe circumference with any desired installation incidence angle γ between the lengthwise axis A relative to the plane E.

The adjusting device 4 forms on its housing 5 at least one light beam barrier 9 having an open slit 9' at one side thereof. The free end of the pendulum 6 reaches into the slit without making contact. More specifically, the barrier 9 and slit 9' are formed at one wedge-shaped tapering end of the housing 5, to the left in FIG. 2 or near the bottom in FIG. 3. In a special embodiment of the invention, the light beam barrier 9 could be replaced by a "light coupler". Further in FIGS. 2 and 3, the position P characterizes the center of gravity of the pendulum 6, that is shifted outwardly, relative to the resultant lever mass M.

According to FIGS. 1, 2 and 3, the measuring probe 3 comprises a probe head 10 that is angled perpendicularly to the lengthwise axis A and that has a measuring sensor, which must be oriented exactly parallel to the extension of the lengthwise axis L of the test pipe 1 in the context of the intended automatic zero point adjustment. In this context it is assumed that, in the installed and illustrated base position, the central axis of the probe head 10 is rotated, under a constantly held angle of 90°, about the axis A with reference to the relative lengthwise center of the adjusting device 4.

Using solid line contours for showing the positioning device 4 and the probe head 10, FIG. 3 represents the absolute zero position that is to be achieved, in which the probe head 10 is oriented exactly parallel to the extension of the lengthwise axis L of the test pipe 1. It is further assumed that the above mentioned lengthwise axis A according to the perspective view of FIG. 1 intersects the lengthwise axis of the test pipe 1 at a right angle Re. According to the illustrated absolute zero position shown in FIG. 3, the adjusting device 4 with its housing in the lengthwise center position Z, is oriented exactly parallel onto the vertical pendulum position N, which extends linearly downwardly in the direction of an arrow M.

In FIG. 3, reference number 11 designates one of a plurality of bridge pieces that are respectively screw-connected externally with the housing 5 of the adjusting device 4 in order to form the rotational bearing 7 (FIG. 2) of the pendulum 6. The adjusting device 4 with the probe 3 is pivotally swingable about the axis A between the two marked limit positions G1 and G2. In the zero point position (N, M on Z) representative of FIG. 3, the maximum angular adjusting or repositioning path between the limit positions G1, G2 thus falls into two equal half angular repositioning paths V1 or V2, by which the pendulum 6 would fictitiously migrate or deviate during a corresponding right or left rotation of the device 4 with the probe 3 (10) into the limit positions G1 or G2.

Relative to the corresponding adjusting movement of the adjusting device 4 with the light beam barrier 9 and with the probe 3, in the achieved pendulum limit positions G1 or G2, light signals are generated by a light beam bundle that thereby impinges without hindrance onto a light detector or a photocell. These light signals define the actually traversed angular repositioning path and are each respectively individually convertible into machine stop signals. The optically received light signals may, for example, be converted into electrical control signals by means of a trigger unit for the purpose of an electromagnetic stopping of the machine. In the area of the free end, the pendulum 6 can comprise an axially centered slit that is open toward the axial end side, and through which the light beam bundle of the light beam barrier 9 passes for illuminating the relatively shifted circular rim of a photocell on the underside of the slit 9' in a limit position G1 or G2 of a light detector. A double light beam barrier respectively tuned to the limit positions G1 or G2 can also be provided.

A schematically illustrated dashed line position of the probe head 10 with the sensor 3 and the adjusting device 4, which requires a correction, is shown at the lower right side of FIG. 3, whereby the axis of the probe head 10 is rotationally tilted by an angle α relative to the lengthwise axis L of the test pipe 1, so that a corresponding angular repositioning deviation α of the adjusting device 4 with the probe 3 and the head 10 toward Z' relative to the vertical pendulum position N, M' results. The error angle α to be corrected, is shown somewhat exaggeratedly large in FIG. 3. In practice the angle α would be smaller, so that an approximately correct position (mechanical zero) can be assumed as a starting point for the purpose of an automatic probe adjustment.

After this pre-adjustment to the approximate mechanical zero, the probe control arrangement is switched on or activated. According to positioning direction St1, hereupon the adjusting device 4 with the probe 3 and head 10 are rotated, for example to the right, about the lengthwise axis A, to such an extent that, upon reaching the one pendulum limit position G1, a positioning relevant first light limit signal is generated, by means of which the device positioning movement toward the right is stopped. This pendulum limit position caused by G1 is received by the computer software responsible for the device positioning, from which a positioning command results, by means of which the adjusting device 4 with the probe 3 and head 10 are subjected to a left rotation St2 about the lengthwise axis A to such an extent that, in the other pendulum limit position G2, a second positioning relevant light limit signal interrupts the device positioning. The traversed angular positioning path (G1–G2) is numerically determined by the computer software, and the calculated angular positioning path is mathematically halved, whereupon the machine control receives the command to allow the adjusting device 4 with the probe 3 and head 10 to return back through this halved angular positioning value according to V1 out of the pivoted position according to St2 the pendulum limit position G2. The position of the adjusting device 4 with the probe 3 and head 10, that is reached thereby is an exact mechanical zero, and the incidence angle error α is corrected. In the context of the numerical determination, the angular positioning path (G1–G2) can be converted into angular degrees by calculating the control logic of an electric computer 27, also see FIG. 2A, before the halving of the angle.

To the extent necessary, the measuring probe 3 with the sensor head 10 could now additionally be subjected to a translational stroke movement T shown in FIGS. 1 and 2, by means of the adjusting device 2, in order to drive the measuring probe 3 closer than illustrated in the direction toward the inner wall of the test pipe 1, for example.

Basically, after the described zero correction, the test run or test process, such as a pressure measurement, a temperature measurement, or the like can begin.

Figure 2A:
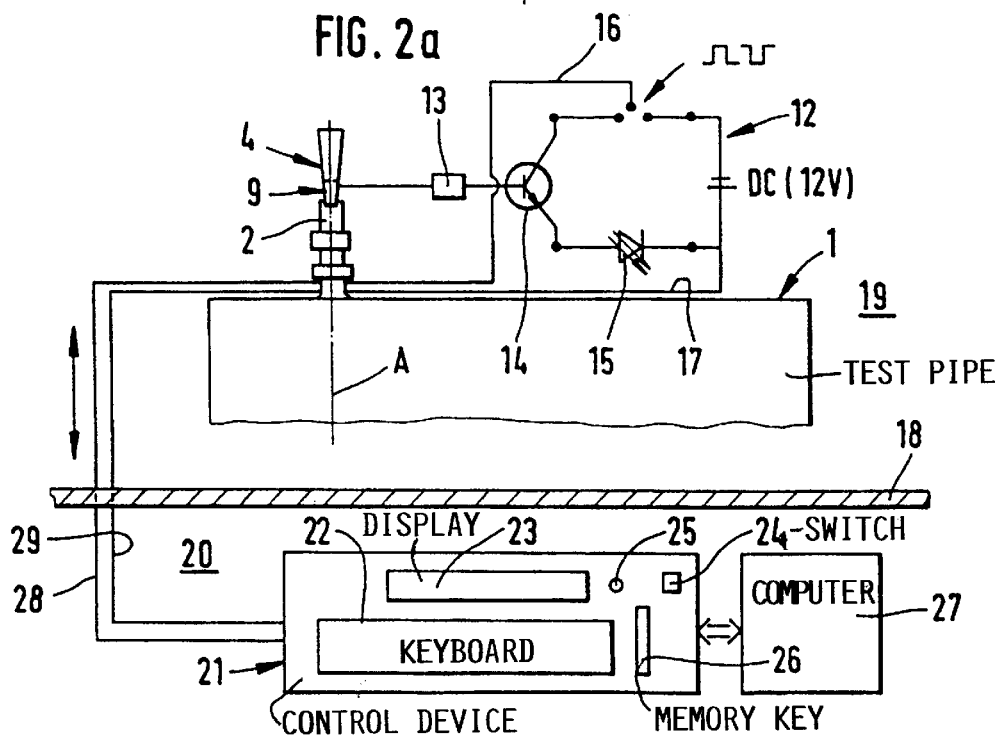
FIG. 2A shows the schematically illustrated overall concept of the apparatus with the arrangement of the control device and the computer in the operating room, locally shielded from the testing chamber by a wall, whereby the test pipe is shown inside the testing chamber but broken off at the bottom and seen from the side, and with a signal processing circuit as well as a respective reference cable connection on the device base or pedestal of the positioning device with the adjusting device.

As has already been mentioned, the light beam barrier 9 may particularly be embodied as a so-called "light coupler", in order to provide not only optically receivable logic signals for the adjusting device control or stopping, from the respectively received light impulses in G1 or G2, but to also provide corresponding acoustic signals through a buzzer or vibrator by means of an accumulator current source DC (FIG. 2A). An electrical circuit 12 for this purpose comprises, among other things, an electrical resistance 13, a universal transistor 14 and a light emitting diode 15 (LED). Component parts of these parts of the circuit 12 serving for signal amplification or logic signal generation may at least partially be integrated as components into the adjusting device 4 in the housing 5. A fiber optic light beam barrier may also be employed, whereby a light emitting diode (LED) serves as the light source. A PIN photodiode can be used as the detector. This arrangement can be combined with an electronic threshold value decision making device for carrying out the evaluation. This device compares the constantly varying analog signal that comes from the detector with a pre-set threshold value, and generates a digital output signal upon overstepping or understepping of the threshold value.

The circuit 12 is connected to the corresponding motorized control part of the adjusting device 2 through the lines 16, 17 using conventional plugs. A wall 18 shields the testing chamber 19 with the test pipe 1, positioning device 2, adjusting device 4, in addition to the circuit 12, among other things, from an operating room 20, in which the electronic control apparatus is arranged. This control apparatus comprises a control device 21 with an operating panel 22 (keyboard), an optical process display field 23 (display), an actuating key or on switch 24, an actuation signal light display 25, and a "memory key" 26. The control device 22 communicates with an electronic computer 27 by means of numerically stored program data (software) for the probe control and positioning or for the calculation or conversion (signal reception, command release) for the purpose of the probe zero point correction. According to FIG. 2A, the control device 21 communicating with the computer 27 is connected to corresponding motorized control parts of the positioning device 2 by two lines 28, 29 and respectively conventional plugs not shown in detail.

Figure 4:
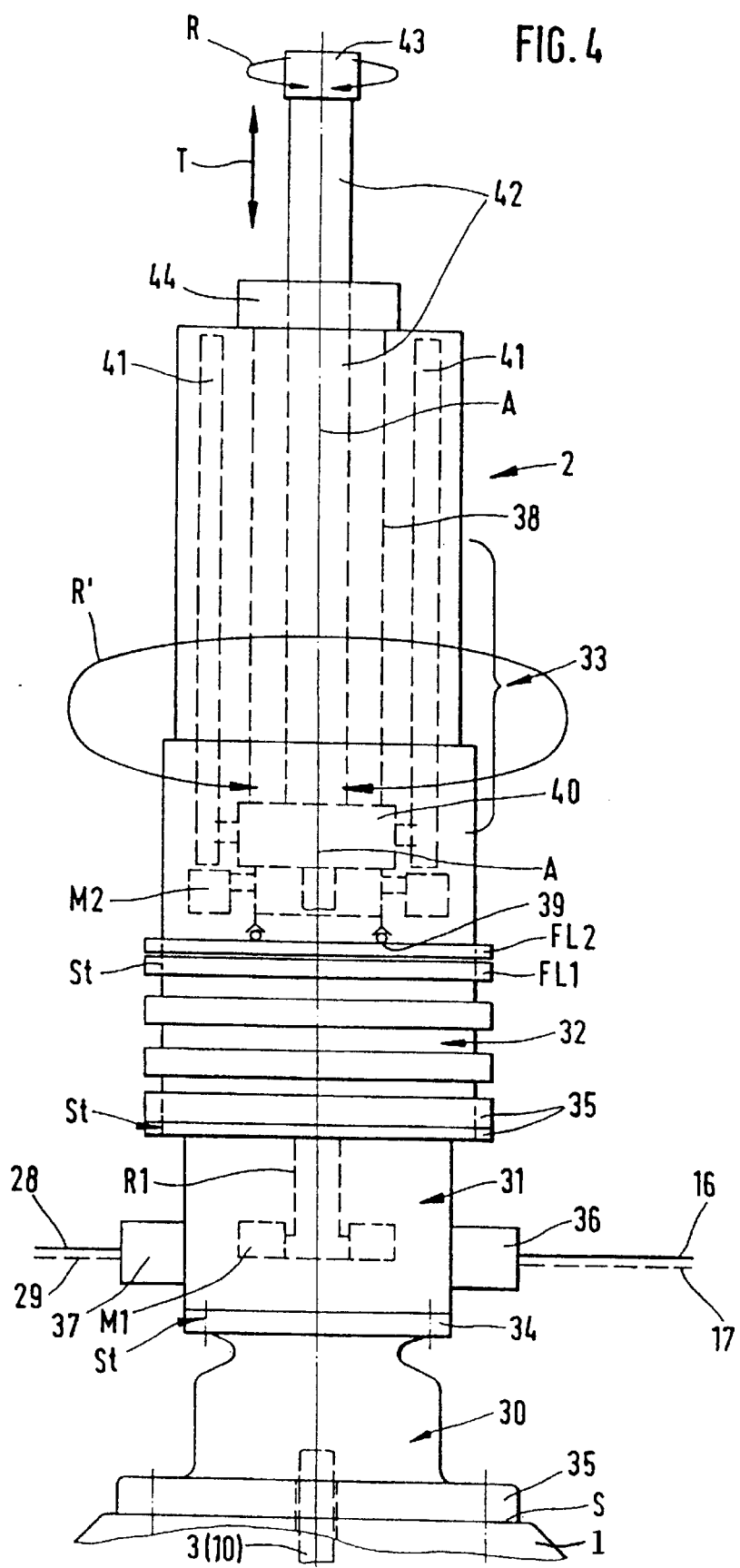
FIG. 4 shows a side view of the probe positioning device, with a schematic detailed illustration of the respective positioning servo-motors as well as the logically or analogously associatedly arranged rotational or linear translational positioning drive, whereby the latter is arranged with a probe tube through the spindle nut arrangement among other things.

FIG. 4 illustrates the construction of the probe positioning device 2, which, as seen from the bottom to the top, essentially comprises a plurality of modular housings 30 to 33 that are removable from one another by means of screw connections St and are exchangeable. Of these housings 30 to 33, a plurality of housings 31, 32, 33 contain and/or embody a drive or positioning devices for the measuring probe 3 with its head 10. The drive and positioning devices are coaxially hollow cylinders in their circumferential regions closest to the lengthwise axis A, so as to enable an unhindered probe guidance or insertion from above or from below of the adjusting device 2.

The above mentioned housings may at least partially be made of titanium or a titanium alloy, and/or out of a fiber, and particularly glass fiber, reinforced composite material.

The housings 30, 31 or 31, 32 or 32, 33 are removably connected to each other at flanges 34, 35, FL1, FL2 by means of axial screw-connections according to the positions St. By means of a loosenable clamp or shackle collar, one flange 35 is circumferentially rotatable and adjustable relative to a central rotatable bearing support and relative to the housing 30 and thus relative to the positioning device 2, for example in order to match threaded holes on the circumferential location S, see also FIG. 1, for example of the test pipe 1 provided for securing the device. The housing 30 with the securing flange 35 is coolable by an air and/or water cooling, the latter in applicable cases in connection with a pipe end part protruding into the hot flow (see F, FIG. 1) to the extent that this is considered as acceptable and necessary in view of the free probe positoning in the test pipe 1 or in the flow channel of a turbine. Starting the cooling can be carried out as a function of a measured local surrounding temperature by a thermoswitch or by the control device 22. For the purpose of the above mentioned cooling, the base or pedestal housing part 30 can comprise cooling channels, through which the cooling fluid is circulated by a pump, whereby the cooling fluid can be guided over a heat exchanger, by means of which the cooling fluid, which has been heated by component cooling, is cooled.

Connection pedestals 36, 37 are located on the housing 31. These pedestals comprise rigid bushings for the respective conventional plugs, in an arrangement corresponding to that for the lines or cables 16, 17 or 28, 29, see also FIG. 2A.

As shown in FIG. 4, a hollow shaft motor M1 is mounted in the housing 31 for providing a coaxial rotational probe drive. The motor M1 may especially be an electric motor embodied as a hollow shaft brush motor with a flange-connected incremental encoder for an angle control. This hollow shaft motor M1 is connected in a force transmitting manner through a rotor R1 with a so-called "harmonic drive transmission" integrally located in the housing 32. Such an arrangement achieves an advantageous gearing reduction of i=160, for example. The positioning mechanics for the translational stroke movement T can be screwed onto the driven side or a rotationally movable driven plate of the transmission flange FL1, whereby the positioning mechanics are enclosed by the outer stroke housing 33. Thus, by means of the hollow shaft motor M1 and the transmission in the housing 32, a driven side or output rotational movement R' of the outer stroke housing 33 with internal components results for achieving a proper probe positioning R about the lengthwise axis A.

For the purpose of a linear translational stroke movement T of the measuring probe 3 with its head 10, an electric motor of the type of a hollow shaft brush motor M2 may similarly be used, whereby this motor M2 is arranged coaxially to the lengthwise axis A on mounting components within the outer stroke housing 33, whereby these mounting components in turn are removably connected with the driven side flange FL1. An incremental encoder is also connected by a flange to this second hollow shaft motor M2 for the purpose of an angle control.

The respective above mentioned incremental encoders comprise two circular plates made of aluminum with an electronic sheet bar or plate, light beam barrier saddle or cradle, and glass control disk, centrally assembled in an aluminum hub. In the functional position, the spacer or stay bolts serve to adjust and screw-connect the plates with the sheet bar or plate or platine.

The above mentioned second hollow shaft motor M2 transmits the rotational drive moment without play directly, for example, to a coaxial hollow cylindrical threaded roller spindle 38 with a respective pitch of 1 mm for example. In this connection, the threaded roller spindle 38 is freely rotatably driven and supported relative to the interior components of the stroke housing 33 by means of a ball bearing arrangement. Such a ball bearing arrangement is shown as a base-side grooved ball bearing 39 on the inside of flange FL2. A ball nut 40 seated on the threaded roller spindle 38 is linearly guided by precision ball bushings, for example along guide shafts 41, and practically forms a guide carriage, which carries a stroke tube 42 with an axially outer clamping jaw head 43, by means of which the probe 3 with its head 10 is manually securable on the stroke tube. An outer stroke tube bearing cover 44 is securable on the top of the stroke housing 33. The conversion of the motor rotational moment into the linear translational stroke movement T in this context may be so dimensioned that a self-locking condition exists with a prescribed axial load of approximately 100 N in the de-energized or current-less condition.

In an alternative second embodiment of the positioning device 2, a "stroke tube-like" linear spindle positioning can be generated for the translational probe positioning T by means of a spindle nut that is ball-bearing-supported on the inner parts of the stroke housing 33. This arrangement results in a reduction of the structural height of the device with an equal comparatively large stroke, relative to the first positioning embodiment. Since no gear drive or belt drive is used in the positioning device 2, neither in the first one nor in the second embodiment, it is possible to transmit the respective motor rotational moments in an extremely play-free manner.

According to another advantageous embodiment it is provided that the positioning device 2 is adjustably arranged on the circumference of the test pipe 1 in a movement Z that is circumferential relative to the lengthwise axis L of the test pipe 1 as shown in FIG. 2. In this connection, the positioning is carried out through the control device 21 in a motor-driven manner as a function of a control program stored in the computer 27.

Instead of the above mentioned test pipe 1, the invention may advantageously be employed in connection with all suitable housing components, for example for turbines or compressors of jet engines or of gas turbine engines.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The device is constructed to position a measuring sensor, especially a sensor head at an angle to a sensor shaft, precisely at the point of measurement and in the direction of a fluid flowing in a test tube, in which there is an adjuster through which the measuring sensor, in a coaxial arrangement, can be adjusted via a first adjusting motor about its axis and/or by a second adjusting motor along its axis. A control device communicates with an electronic computer for controlling the sensor adjustment. An adjuster (4) is coupled to the sensor to rotate in unison therewith and has a rotatable pendulum which, in the position of rest transversely to the test tube axis defines the zero position of the sensor. Limit positions of the pendulum are predetermined from a relative movement of the adjuster about the axis which can be photometrically converted into position signals. The computer mathematically halves the angular adjustment calculated from the position signals received and sets the adjuster with the sensor to mechanical zero by the respective positioning stop command signals.

What is claimed is:

1. An apparatus for positioning a measuring probe (3) having a probe axis (A), relative to a measuring location and relative to a fluid flow direction (F) in a fluid flow testing enclosure (1) having an enclosure axis (L), said apparatus comprising:

(a) a positioning device (2) having a positioning axis extending coaxially in axial alignment with said probe axis (A), said positioning device (2) comprising a first servomotor (M1) for positioning said measuring probe (3) by rotating said measuring probe (3) around said probe axis (A), and a second servomotor (M2) for displacing said measuring probe (3) in a direction (T) of said probe axis (A), (b) a control system including an electronic computer (27) and a control device (21) communicating with said electronic computer (27) and with the servomotor for controlling said positioning of said measuring probe (3), (c) an adjusting device (4) rigidly coupled to said measuring probe (3) for rotation with said measuring probe (3), said adjusting device (4) comprising a pendulum (6) rotatably supported on a pendulum journal axis (8) for defining a zero position (N) for said measuring probe (3) when said pendulum (6) is in a rest position, (d) pendulum limits (G1, G2) defined in said adjusting device (4) in such positions that said zero position (N) is located centrally between said pendulum limits (G1, G2), (e) means (9, 9') for generating signals in response to pendulum excursions reaching said pendulum limits (G1, G2) and for providing respective limit position signals to said electronic computer (27), and wherein (f) said electronic computer (27) generates control signals in response to said limit position signals by mathematically dividing a pendulum angular excursion range defined by said limit position signals between said pendulum limits (G1, G2), into two halves for controlling said servomotors with said control signals until a line (M) through a center of gravity (P) of said pendulum (6) coincides with said zero position (N), whereby said measuring probe (3) is in a defined position relative to said enclosure axis (L).

2. The apparatus according to claim 1, further comprising a plug-on mounting fixture (44) for rigidly securing said adjusting device (4) to a linear motion transmission element forming a stroke member (42) of said measuring probe (3) extending out of a top of said positioning device (2).

3. The apparatus according to claim 1, wherein said positioning device (2) is mounted by a mounting flange (35) to an outer circumferential location (S) of said testing enclosure (1) so that said probe axis (A) or an extension of said probe axis (A) intersects said testing enclosure axis (L) at a right angle (Re), and wherein an angle (γ) is enclosed between a vertical lengthwise center plane (E) of said testing enclosure (1) and said probe axis (A) or an extension of said probe axis (A).

4. The apparatus according to claim 1, wherein said journal axis (8) of said pendulum (6) coincides with said probe axis (A) or is outwardly tilted by an angle (β) relative to said probe axis (A).

5. The apparatus according to claim 1, wherein said measuring probe (3) comprises a sensor head (10) positioned at a right angle relative to said probe axis (A) of said measuring probe (3) and so that said sensor head (10) is oriented in a position that is rotated by 90° relative to a longitudinal axis of said pendulum (6) of said adjusting device (4).

6. The apparatus according to claim 1, wherein said means for generating signals comprises a light sensor and a light source (15), wherein a free outer end of said pendulum (6) forms a light beam barrier (9), wherein said adjusting device (4) comprises a housing (5), slits (9') positioned in said housing (5) so that light from said light source is interrupted when said pendulum (6) reaches said pendulum limits (G1, G2) to produce light signals which are processed into logic signals.

7. The apparatus according to claim 6, wherein said light barrier comprises a light coupler, wherein said means for generating signals comprise a circuit (12) including circuit components integrated into said housing (5) of said adjusting device (4), said circuit (12) being adapted for converting said pendulum excursions reaching said pendulum limits (G1 or G2) into logic signals by means of an electrical resistance (13) as part of said circuit (12), said circuit further comprising a transistor (14), a light emitting diode (15-LED), a DC current source, and electrical conductor cables (16, 17) connecting said circuit (12) to a corresponding motor control for said servomotors.

8. The apparatus according to claim 1, wherein said adjusting device (4) comprises a housing (5) formed with a wedge-shape tapering in a direction toward a housing end, wherein said pendulum (6) forms at its end a light beam barrier (9) as part of said means for generating signals, said housing (5) comprising a removable outer housing cover and bridge pieces (11) lying above one another with a spacing, and a journal bearing (7) for said journal axis (8) of said pendulum (6) positioned at or between said bridge pieces (11), and wherein said bridge pieces (11) are removably screw-connected with said housing (5).

9. The apparatus according to claim 1, further comprising control conductor cables (28, 29) connecting said control device (21) and electronic computer (27) to said servomotors for a translational and rotational movement control (T, R) of said measuring probe (3), said control conductor cables being adapted for passing from said control device (21) and said computer (27) through a wall (18) shielding an operating room (20) from a testing chamber (19), wherein said positioning device (2) comprises a housing in which said servomotor second servomotor is housed, and plug and socket means (37) passing through said housing for connecting said control conductor cables (28, 29) to said servomotors.

10. The apparatus according to claim 1, wherein said adjusting device (2) comprises a housing including a plurality of exchangeable modular housing sections (30, 31, 32, 33), screw connections (ST) removablely interconnecting said housing sections with one another, wherein a first housing section forms a base housing section (30), wherein said first servomotor (M1) is mounted in a second housing section (31) sitting on said base housing section (30) for the rotational probe positioning, a third housing section (32) on said second housing section (31) mounting a rotational speed reduction transmission for said first servomotor (M1), and wherein said second servomotor (M2) is housed in a fourth housing section (33) forming a stroke housing (33) screw-connected to said third housing section (32), said positioning device (2) further comprising linear transmission means including at least one linear transmission element (42) for a translational probe positioning (T).

11. The apparatus according to claim 10, wherein said at least one linear transmission element is formed as a hollow cylindrical component forming a stroke tube (42).

12. The apparatus according to claim 10, wherein said plurality of housing sections of said housing of said positioning device (2) are at least partially made of a rigid lightweight structural material, selected from the group of titanium, titanium alloys, and a fiber reinforced composite material.

13. The apparatus according to claim 10, wherein said first servo-motor (M1) for said rotating comprises a rotor (R1) for transmitting its drive power to said speed reduction transmission on said third housing section (32), whereby the driven side of said speed reduction transmission is embodied by a flange-like driven power take-off plate (FL1), onto which said stroke housing (33) with said at least one linear transmission element (42) is screw-connected by a flange (FL2).

14. The apparatus according to claim 10, wherein said linear transmission means further comprise a coaxial hollow cylindrical threaded roller spindle (38) rotatably supported by at least one antifriction rotational bearing arrangement (39) on inner parts of said stroke housing (33), said roller spindle (38) being driven by said second servomotor (M2), said linear transmission means further comprising a ball nut (40) seated on and guided by said roller spindle (38) for a linear position adjustment, said ball nut (40) forming a guide carriage for said at least one linear transmission element (42) forming a stroke tube (42) for linearly displacing said measuring probe (3).

15. The apparatus according to claim 14, further comprising guide shafts (41) for said guide carriage formed by said ball nut (40) which is linearly movable along said guide shafts (41).

16. The apparatus according to claim 14, further comprising precision ball bushings for a linear guidance of said guide carriage formed by said ball nut (40).

17. The apparatus according to claim 10, further comprising a spindle nut driven by said second servomotor (M2), wherein said spindle nut (40) is rotatably supported on an inner part of said stroke housing (33), and further comprising a ball roller spindle cooperating with said spindle nut for converting a nut rotation into a linear motion of said ball roller spindle for positioning said measuring probe (3).

18. The apparatus according to claim 10, wherein said at least one linear transmission element (42) forms a stroke tube to which said measuring probe (3), is attachable axially and externally of said stroke tube by a clamping jaw head (43), and wherein said stroke tube comprises a bearing cover (44) removably mounted on said stroke housing (33).

19. The apparatus according to claim 1, wherein said first servomotor (M1) for said rotating and a second servomotor (M2) for said displacing are hollow shaft brush motors.

20. The apparatus according to claim 19, further comprising an incremental encoder flange-connected to the corresponding servomotor (M1, M2) for a respective angle conforming control.

21. The apparatus according to claim 1, further comprising a housing for said positioning device (2), said housing comprising a base housing section (30) operatively attached to a circumferential location (S) on test enclosure (1), and wherein said base housing section is coolable by a cooling fluid.

22. The apparatus according to claim 21, further comprising cooling fluid flow means for cooling said housing and a thermoswitch for automatically controlling said cooling fluid flow means in response to a measured local surrounding temperature or by said control device (21).

23. The apparatus according to claim 21, wherein said base housing section (30) comprises cooling channels through which said cooling fluid is circulated by a pump, and further comprising a heat exchanger for cooling said cooling fluid when said cooling fluid has taken up heat from said housing.

24. The apparatus according to claim 1, further comprising a housing for said positioning device (2), said housing comprising a base housing section (30) which is rotatable and adjustable relative to a securing flange (35) of said housing of said positioning device (2), and a releasable clamp for adjustably securing said base housing section (30) through said flange (35) to said housing of said positioning device (2).

25. The apparatus according to claim 1, further comprising a housing for said positioning device (2), wherein said housing is arranged on the circumference of said testing enclosure (1) for a position-adjustable movement along a circumferential direction (Z) relative to said enclosure axis (L) of said testing enclosure (1), wherein a positional adjustment is carried out through said control device (21) in a motorized manner in response to a control program stored in said electronic computer (27).

26. The apparatus according to claim 1, wherein said testing enclosure is one of a testing pipe (1), a cylindrical housing of a compressor, a cylindrical housing of a turbine, a jet pipe, and a cylindrical housing of a gas turbine engine.

* * * * *

UNITED STATES PATENT AND TRADEMARK OFFICE
CERTIFICATE OF CORRECTION

PATENT NO. : 6,170,345 B1
DATED : January 9, 2001
INVENTOR(S) : Kerner

It is certified that error appears in the above-identified patent and that said Letters Patent is hereby corrected as shown below:

Column 3,
Line 22, (actual line count), after "of", replace " :he" by -- the --;

Column 4,
Line 27, after "pipe", replace "i s" by -- is --;
Line 42, before "relative", replace "a" by -- α --;

Column 5,
Line 62, after "housing", insert -- 5 --;

Column 9, line 61, to Column 10, line 12,
Delete the paragraph at these lines.

Signed and Sealed this

Twenty-third Day of October, 2001

*Attest:*

*Attesting Officer*

NICHOLAS P. GODICI
*Acting Director of the United States Patent and Trademark Office*